United States Patent [19]

Adachi et al.

[11] Patent Number: 5,788,599

[45] Date of Patent: Aug. 4, 1998

[54] CONTINUOUSLY VARIABLE TRANSMISSION SYSTEM FOR VEHICLE

[75] Inventors: Kazutaka Adachi, Yokohama; Shigeru Ishii, Atsugi, both of Japan

[73] Assignee: Nissan Motor Co., Ltd., Yokohama, Japan

[21] Appl. No.: 628,234

[22] Filed: Apr. 4, 1996

[30] Foreign Application Priority Data

Apr. 12, 1995 [JP] Japan .................................. 7-086991

[51] Int. Cl.⁶ ............................................. F16H 9/00
[52] U.S. Cl. .................................. 477/45; 477/46
[58] Field of Search ........................ 477/43–49; 474/18

[56] References Cited

U.S. PATENT DOCUMENTS

| | | | |
|---|---|---|---|
| 4,916,982 | 4/1990 | Suzuki | 477/45 X |
| 5,009,127 | 4/1991 | Morimoto et al. | 477/46 X |
| 5,009,129 | 4/1991 | Morimoto et al. | 477/46 X |

FOREIGN PATENT DOCUMENTS

| | | |
|---|---|---|
| 59-217047 | 12/1984 | Japan . |
| 3-121358 | 5/1991 | Japan . |

*Primary Examiner*—Khoi Q. Ta
*Attorney, Agent, or Firm*—Foley & Lardner

[57] ABSTRACT

A rotation ratio of a continuously variable transmission for a vehicle provided with a pair of variable pulleys whereof the diameter of a contact part with a V-belt is made to vary according to an oil pressure, is controlled according to the running state of a vehicle. An oil pressure control valve is therefore provided to control the oil pressure. A rotation ratio command value is computed from a target rotation ratio set according to the vehicle running state and a control variable set for each rotation ratio according to the dynamic characteristics of the transmission. By inputting a signal based on this rotation ratio command value to the oil pressure control valve, a desirable speed change response is obtained.

5 Claims, 10 Drawing Sheets

1

CONTINUOUSLY VARIABLE TRANSMISSION SYSTEM FOR VEHICLE

FIELD OF THE INVENTION

This invention relates to control of automatic transmission system for a vehicle using a continuously variable transmission.

BACKGROUND OF THE INVENTION

A continuously variable automatic transmission system for a vehicle may for example comprise a hydraulic transmission such as a torque converter or fluid coupling which transmits engine rotation power, and a continuously variable transmission (referred to hereinafter as CVT) which changes the rotation speed of the hydraulic transmission output that is transmitted to the drive shaft of the vehicle.

Unlike conventional transmissions, a CVT has an indefinite number of drive ratios, and for that it is arranged to transmit a rotation via a V-belt looped over a pair of pulleys on the drive side and driven side. The width of each pulley varies according to oil pressure, the drive ratio being continuously varied by increasing the width of one pulley and decreasing the width of the other. This operation is performed by adjusting the opening of a control valve which supplies oil pressure to each pulley. The drive ratio is preset according to running conditions such as the vehicle speed, engine rotation speed and engine load, and the transmission system is provided with a control mechanism that adjusts the opening of the control valve so that a drive ratio corresponding to the actual vehicle running conditions is implemented.

Tokkai Hei 3-121358 published in 1991 and Tokkai Sho 59-217047 published in 1984 by the Japanese Patent Office disclose inventions relating to this control algorithm.

However, even when the control mechanism outputs a target value of a suitable drive ratio, it may occur that the CVT does not exhibit the desired speed change response.

One reason for this is that the relation between the oil pressure supplied to the pulleys and the drive ratio is not necessarily linear. Another reason is that, as the working oil flowrate varies according to the pulleys' oil pressure, i.e. according to the drive ratio, the dynamic characteristics of the drive ratio are not uniform when there is a change-over from one drive ratio to a different drive ratio. When a control valve having different characteristics in the upshift (speed increase) and downshift (speed decrease) directions is used, the speed change response will of course be different according to whether the drive ratio is increasing or decreasing. Such an arrangement is sometimes applied to enable a speed change in the event of a fault or a breakdown of the valve.

SUMMARY OF THE INVENTION

It is therefore an object of this invention to improve the response of a continuously variable transmission for use in a vehicle.

It is a further object of this invention to enable speed change to take place with a suitable response in both directions in a continuously variable transmission system with a control valve having different dynamic characteristics according to the direction of speed change.

In order to achieve the above objects, this invention provides a continuously variable transmission system for a vehicle.

The system comprises a continuously variable transmission which has a V-belt and a pair of variable pulleys on which said V-belt is looped, whereof the diameter of a part in contact with said V-belt is caused to vary according to an oil pressure, is provided for this system. The system further comprises a mechanism for detecting a running state of the vehicle, a mechanism for setting a target rotation ratio of the transmission from the running state, a mechanism for setting a control variable which is different for each rotation ratio based on a dynamic characteristic of the transmission, a mechanism for computing a rotation ratio command value based on the target rotation ratio and the control variable, and a control valve for controlling the oil pressure according to a signal based on the rotation ratio command value.

It is preferable that the system further comprises a mechanism for detecting a real rotation ratio of the transmission and the computing mechanism computes the rotation ratio command value based on the real rotation ratio, the target rotation ratio and the control variable. It is further preferable that the system further comprises a mechanism for determining a rotation speed change direction based on a variation of the real rotation ratio and the control variable setting mechanism sets a different control variable according to the direction at a same rotation ratio.

It is also preferable that the system further comprises a mechanism for converting the rotation ratio command value to the signal such that the rotation ratio command value and the real rotation ratio are in a linear proportional relationship.

In this case, the pulleys preferably comprise a drive pulley and a driven pulley, and the converting mechanism preferably converts the rotation ratio command value to the signal based on a relation between a drive pulley interval $D_s$ and a rotation ratio $i_p$ obtained from the following relations (a), (b) and (c):

$$r_i = \frac{D_S}{2 \cdot \tan\beta} + r_{i0} \tag{a}$$

$$r_0 = \frac{2 \cdot r_i - \pi \cdot D_C + \sqrt{(2 \cdot r_i - \pi \cdot D_C)^2 - 4 \cdot \{r_i^2 + \pi \cdot D_C \cdot r_i + D_C \cdot (2 \cdot D_C - L_B)\}}}{2} \tag{b}$$

$$i_P = \frac{r_0}{r_i} \tag{c}$$

where:

$r_i$ is radius of drive pulley belt contact part, $r_{i0}$ is minimum radius of drive pulley, $r_0$ is radius of belt contact part of driven pulley, $D_C$ is inter-axial distance between drive pulley and driven pulley, $L_B$ is overall length of belt, b is pulley sheave angle.

The details as well as other features and advantages of this invention are set forth in the remainder of the specification and are shown in the accompanying drawings.

DESCRIPTION OF THE PREFERRED EMBODIMENTS

Figure 1:
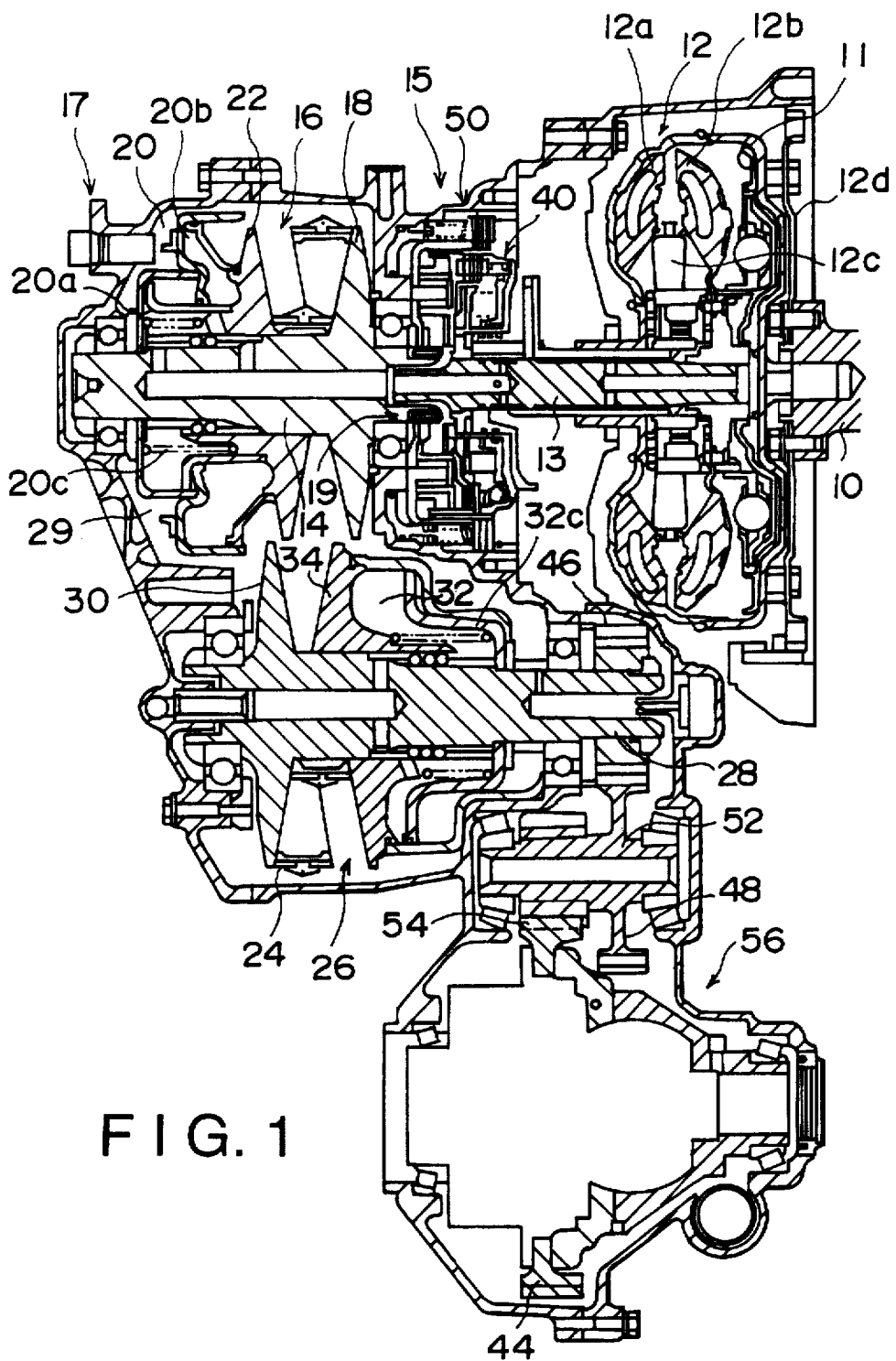
FIG. 1 is a vertical sectional view of a continuously variable transmission according to this invention.

Referring to FIG. 1 of the drawings, a torque converter 12 is connected to an engine output shaft 10. A fluid coupling or an electromagnetic clutch may be used instead of the torque converter 12.

The torque converter 12 comprises a lockup clutch 11. The lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17.

The CVT 17 comprises a drive pulley 16 and driven pulley 26, and a V-belt 24 which transmits the rotation of the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plated 30.

The driven pulley 26 is provided with a drive gear 46 which rotates together with the pulley 26. The drive gear 46 engages with an idler gear 48 on an idle shaft 52. The idler shaft 52 comprises a pinion gear 54 which rotates together with the shaft 52. The pinion gear 54 engages with a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the transmission 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56 drive pulley 16, V-belt 24, driven pulley 26, driven shaft 28, drive gear 46, idler gear 48, idler shaft 52, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid dynamic transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32 via a control system described hereinafter.

Figure 2:
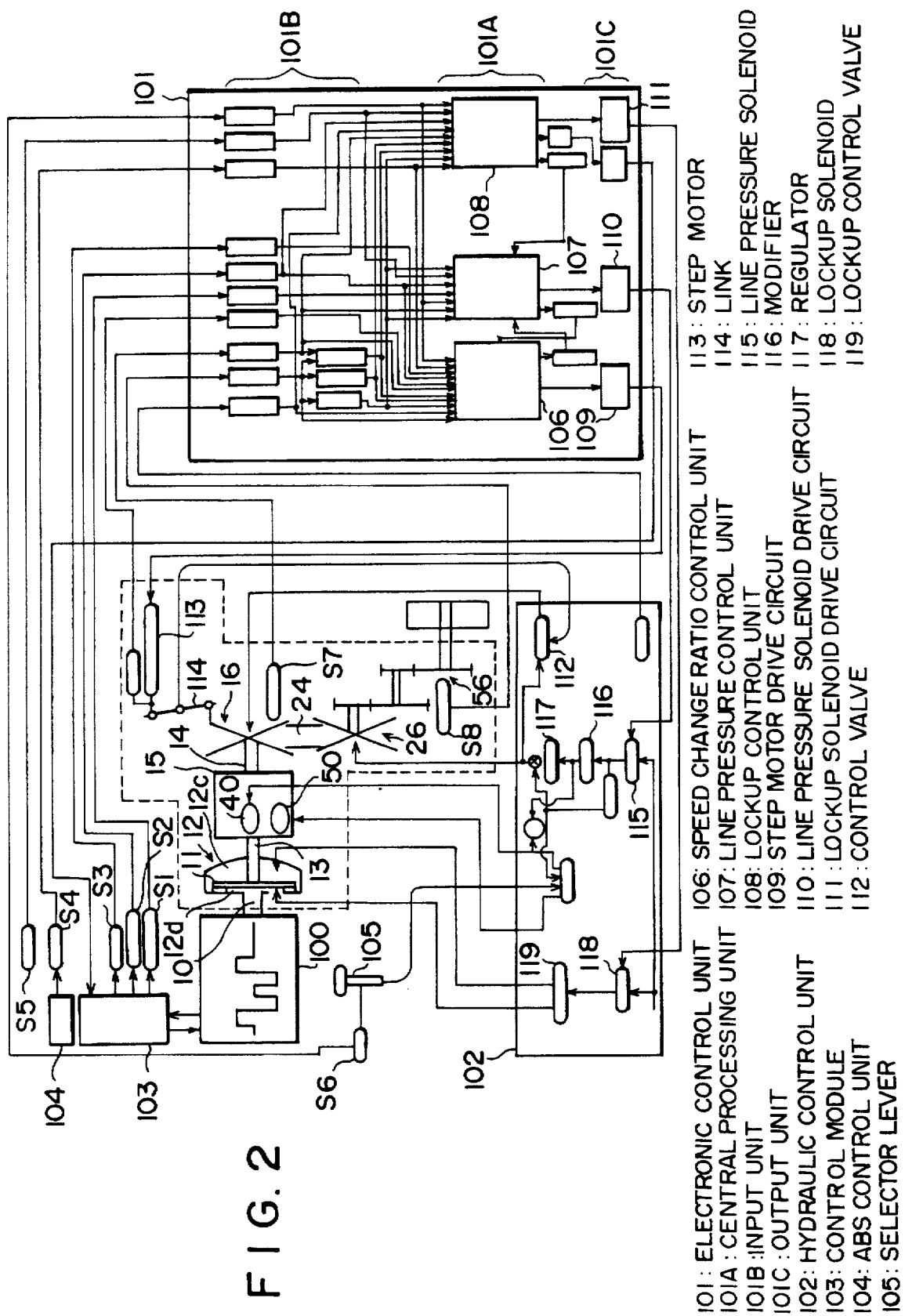
FIG. 2 is a schematic diagram of a controller according to this invention.

The rotation ratio of the CVT 17 is controlled by the control unit shown in FIG. 2. The same symbols are used as for the mechanism in FIG. 1.

In FIG. 2, 101 is an electronic control unit comprising a microprocessor, and 102 denotes a hydraulic control unit comprising various oil pressure control valves. In this control system, the main means of controlling the aforesaid CVT are the electronic control unit 101 and the hydraulic control unit 102.

The electronic control unit 101 comprises a central processing unit 101A for processing control computations, an input unit 101B which converts running state signals from the engine and the vehicle into a form in which they can be processed and inputs them, and an output unit 101C which converts control signals output by the central processing unit 101A into instrument or circuit drive signals and outputs them.

The signals input to the input unit 101B are a water temperature signal S1 used by a control module 103 which electronically controls the fuel injection amount and ignition timing of the engine 100, a throttle opening signal S2, an engine speed signal S3, an ABS operating signal S4 from an antilock brake system (ABS) control unit 104, a braking signal S5 which is issued when the vehicle is braked, a selector position signal S6 issued by an inhibitor switch to indicate the operating position of a selector lever 105, a rotation speed signal (turbine rotation speed signal) S7 from the drive pulley 16, and a rotation speed signal (vehicle speed signal) S8 from the driven pulley 26. The input unit 101B supplies these signals to the central processing unit as necessary.

The central processing unit 101A comprises a speed change ratio control unit 106, line pressure control unit 107 and lockup control unit 108. The central processing unit 101A computes control signals using required signals selected from the aforesaid signals, and drives a step motor drive circuit 109, line pressure solenoid drive circuit 110 and lockup solenoid drive circuit 111 comprising the output unit 101C so as to control the gear ratio, line pressure and lockup clutch of the transmission.

Describing the function of the central processing unit 101A in more detail, the speed change ratio control unit 106 outputs a control signal to the step motor 109 so that rotation ratio change takes place according to a predetermined pattern depending on engine load and speed represented by throttle opening and on vehicle speed. Based on these control signals, the step motor drive circuit 109 drives a step motor 113 connected to a control valve 112 of the hydraulic control unit 102.

The step motor 113 drives the control valve 112 so as to obtain a rotation ratio corresponding to a signal from the step motor drive circuit 109, controls the line pressure supplied to the drive pulley cylinder chamber 20 shown in FIG. 1, and causes a relative variation in the pressures of the drive pulley cylinder chamber 20 and driven pulley cylinder chamber 32.

The displacement position of the drive pulley 16, i.e. the rotation ratio, is fed back to the control valve 112 via a link 114. Due to this feedback control, after a target rotation ratio corresponding to the position of the step motor 113 has been obtained, the gear control unit 106 fixes the relative pressures of the pulley cylinders 20, 32 and maintains the gear ratio at the target gear ratio.

In this rotation ratio control of the transmission 17, when the line pressure acting on the pulleys 16, 26 is too small, there is insufficient friction between the pulleys 16, 26 and the V-belt 24, and the V-belt 24 slips. Conversely, when the line pressure is too high, friction needlessly increases. In either case, the vehicle's fuel costs and motive performance are adversely affected. For this purpose, the line pressure control unit 107 controls the line pressure via the line pressure solenoid drive circuit 110 so that a suitable motive force which is neither too large nor too small is transmitted according to the running conditions.

More specifically, the line pressure solenoid drive circuit 110 controls the position of the line pressure solenoid 115 of the hydraulic control unit 102 according to a control signal from the drive circuit 110. The line pressure solenoid 115 supplies oil pressure from an oil pump, not shown, to the driven pulley chamber 32 after it has been adjusted to a suitable target line pressure via a modifier (pressure control valve) 116 and regulator (fixed pressure valve) 117.

The lockup control unit 108 connects the lockup clutch 11 when for example the vehicle speed is equal to or higher than a predetermined value, and releases the clutch 11 when the vehicle speed has fallen below the predetermined value.

The lockup control unit 108 drives a lockup solenoid 118 of the hydraulic control unit 102 via the lockup solenoid drive circuit 111 according to the vehicle speed, and this solenoid 118 changes over a lockup control valve 119. The lockup control valve 119 is a valve which changes over between a system that supplies oil pressure from the oil pressure pump to the converter chamber 12c of the torque converter 12 as an apply pressure of the lockup clutch 11 and releases the lockup oil chamber 12d, and a system that supplies oil pressure from the oil pressure chamber to the lockup oil chamber 12d as a release pressure and releases the pressure in the converter chamber 12c.

The aforesaid is a description of continuously variable automatic transmission to which this invention can be applied, and its control unit. The basic construction of the aforesaid continuously variable automatic transmission and the control unit is identical to that disclosed for example in Tokkai Hei 3-121358 of the aforesaid prior art.

According to this invention, in the aforesaid CVT and its control unit, a rotation ratio command value is set based on inherent motive characteristics of the CVT so as to optimize the speed change response of the CVT.

Figure 3:
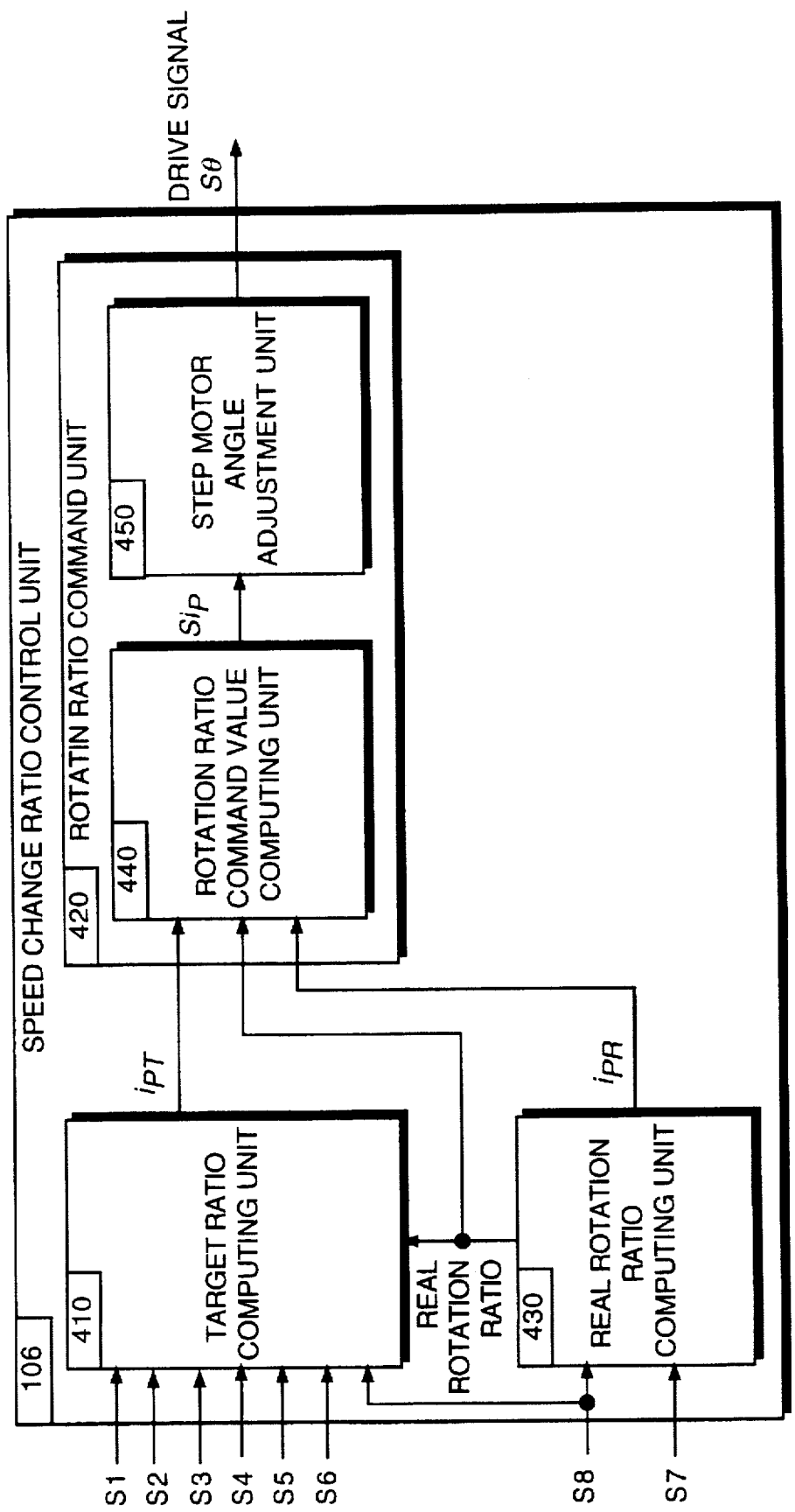
FIG. 3 is a block diagram of a speed change control part of the controller according to this invention.

The construction of the speed change ratio control unit 106 required to achieve this purpose is shown in FIG. 3.

The speed change ratio control unit 106 comprises a target ratio computing unit 410 which computes a target rotation ratio $i_{pT}$ corresponding to the running conditions based on various running condition signals such as the throttle opening signal S2 and engine speed signal S3, a rotation ratio command unit 420 which outputs a step motor drive signal Sθ as a final command value based on a comparison between the target rotation ratio $i_{pT}$ and real rotation ratio $i_{pR}$, and a real rotation ratio computing unit 430 which computes the real rotation ratio $i_{pR}$ of the transmission based on the rotation speed signal S7 from the drive pulley 16 and the rotation speed signal S8 from the driven pulley 26.

The rotation ratio command unit 420 comprises a rotation ratio command value computing unit 440 which feeds back the real rotation ratio $i_{pR}$ and computes a rotation ratio command value $Si_P$ such that the rotation ratio varies with a predetermined characteristic towards the target rotation ratio $i_{pT}$ and a step motor angle position adjustment unit 450 which converts this computation result to an angle position of the step motor 113 and outputs it as a drive signal Sθ.

Figure 4:
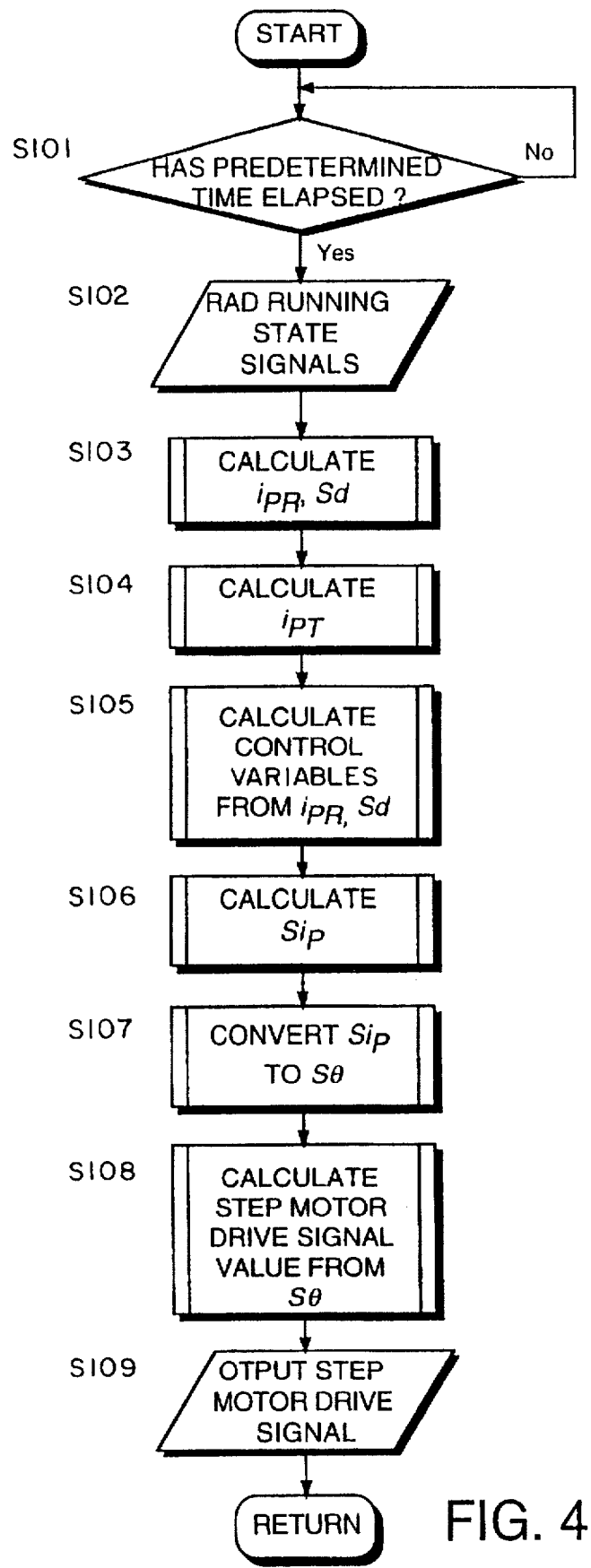
FIG. 4 is a flowchart showing a speed change control process according to this invention.

The rotation ratio control process due to this rotation ratio control unit 106 will now be described using the flowchart of FIG. 4.

In order to execute this process with a predetermined period, first in a step S101, the system waits for a predetermined time to elapse. In a step S102, various running state signals are read. In a step S103, the real rotation ratio $i_{pR}$ is computed based on an input shaft speed signal S7 and an output shaft speed signal S8 of the continuously variable transmission. Based on a comparison of this $i_{pR}$ and $i_{pR}$ computed on the immediately preceding occasion, the process also determines a speed change direction value Sd indicating whether the rotation ratio is increasing or decreasing.

In a step S104, the target rotation ratio $i_{pT}$ is computed based on the running state signals, and in a step S105 control variables $C_1(i_P)$, $C_2(i_P)$ for each rotation ratio are computed from dynamic characteristics $G_P(s)$ previously found from experiment for each particular type of CVT according to the rotation ratio $i_P$, speed change direction Sd, and the desired gear response $G_T(s)$. In a step S106, the rotation ratio command value $Si_P$ is computed based on these control variables.

Figure 5:
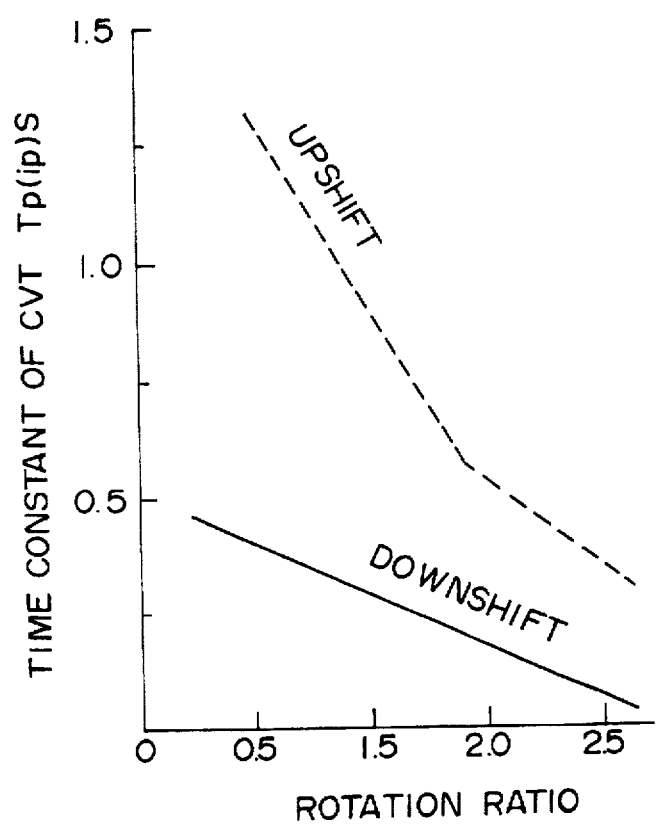
FIG. 5 is a graph showing a relation between a rotation ratio and a time constant for each speed change direction, according to this invention.

The aforesaid Ghd P(s), $G_T(s)$, $C_1(i_P)$, $C_2(i_P)$, $Si_P$ are determined respectively by the following equations:

$$G_P(s) = \frac{K_P(i_P)}{T_P(i_P)s + 1} \cdot \exp(-Ls) \tag{1}$$

$$G_T(s) = \frac{1}{T_T s + 1} \cdot \exp(-Ls) \tag{2}$$

$$C_1(i_P) = \frac{T_P(i_P)}{T_P(i_P) - T_T} \tag{3}$$

$$C_2(i_P) = \frac{T_T}{T_P(i_P)} - 1 \tag{4}$$

$$Si_P = C_2(i_P) \cdot \{C_1(i_P) \cdot i_{PT}(t) - i_{PR}(t)\} \tag{5}$$

where:

$K_P(i_P)$ is the gain of the CVT, $T_P(i_P)$ is a time constant of the CVT determined by the rotation ratio and speed change direction as shown in FIG. 5, $T_T$ is a time constant corresponding to the desired response, L is an ineffective time, s is a differential operator, t is time (present time of control computation period), $i_{PT}(t)$ is the target rotation ratio at time t, and $i_{PR}(t)$ is the real rotation ratio at time t.

The computed rotation ratio command value $Si_P$ reflects dynamic characteristics for each rotation ratio and speed change direction of the CVT, i.e. it expresses a desired speed change response for any rotation ratio and speed change direction.

However, as the angle position of the step motor 113 and the rotation ratio of the CVT are not generally directly proportional, the step motor angle position, i.e. its drive signal Sθ, is calculated so that the rotation ratio command value $Si_P$ is proportional to the real rotation ratio, and is then output (steps S107–S109).

The following relations (6)–(8) are used to perform this conversion. In the equations below, a converted amount of a rotation ratio command value is determined, based on a relation between an interval $D_S$ of the drive pulley 16 corresponding to the angle position of the step motor 113 and the rotation ratio $i_P$, so that the rotation ratio command value $Si_P$ and the rotation ratio $i_P$ are proportional:

$$r_i = \frac{D_S}{2 \cdot \tan\beta} + r_{i0} \tag{6}$$

$$r_0 = \frac{2 \cdot r_i - \pi \cdot D_C + \sqrt{(2 \cdot r_i - \pi \cdot D_C)^2 - 4 \cdot \{r_i^2 + \pi \cdot D_C \cdot r_i + D_C \cdot (2 \cdot D_C - L_B)\}}}{2} \tag{7}$$

$$i_P = \frac{r_0}{r_i} \tag{8}$$

where:

$r_i$ is radius of drive pulley belt contact part, $r_{i0}$ minimum radius of drive pulley, $r_0$ is radius of belt contact part of driven pulley, $D_C$ is inter-axial distance between drive pulley and driven pulley, $L_B$ is overall length of belt, β is pulley sheave angle.

Figure 6:
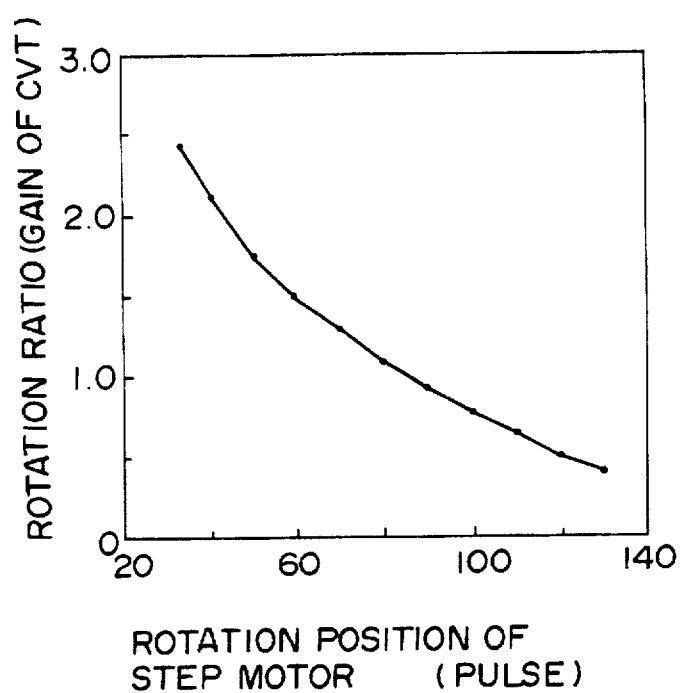
FIG. 6 is a graph showing a relation between a step motor angle position and rotation ratio, according to this invention.

As the specifications and dimensions of the CVT are already known, instead of computing the converted amount based on the conversion equation each time a control operation is performed, the computation results may previously be prepared as a map such as shown in FIG. 6, or converted amounts based on experimental results may be prepared as a map, and the conversed amount of the rotation ratio command value read from these maps as necessary.

Figure 7:
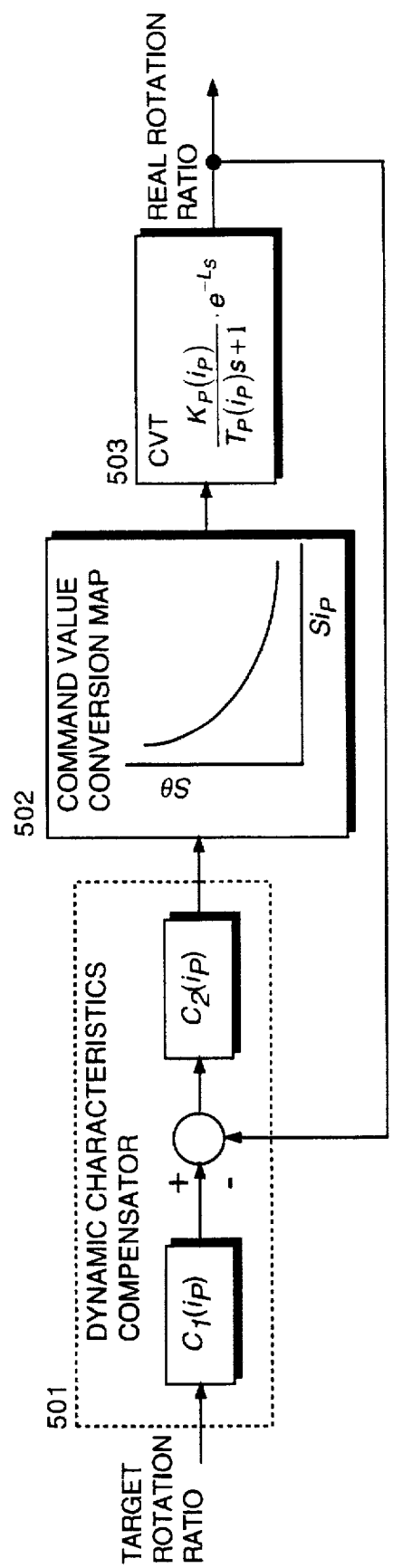
FIG. 7 is a block diagram showing a concept of computing an angle position command value, according to this invention.

FIG. 7 is a block diagram of the control concept when the converted amount is determined by reading a map in this way. In this case, a dynamic characteristics compensator 501 performs the aforesaid calculations (1)–(5), a map 502 is searched based on the rotation ratio command value obtained $Si_P$, an angle position command value of the step motor Sθ is found, and this angle position command value Sθ is output to the step motor. The CVT 503 then responds to this angle position command value Sθ with the dynamic characteristics $G_P(s)$ shown in equation (1) above, and the target rotation ratio is attained with the desired speed change response $G_T(s)$ shown in Equation (2).

The aforesaid converted amount is set in order to define the relation between the variable pulley position and the rotation ratio. This type of conversion corrects the non-linear relation arising between the control valve position and the rotation ratio when, for example, the flowrate characteristics of the valve differ depending on its stroke position and operating direction.

Figures 8A, 8B, 8C:
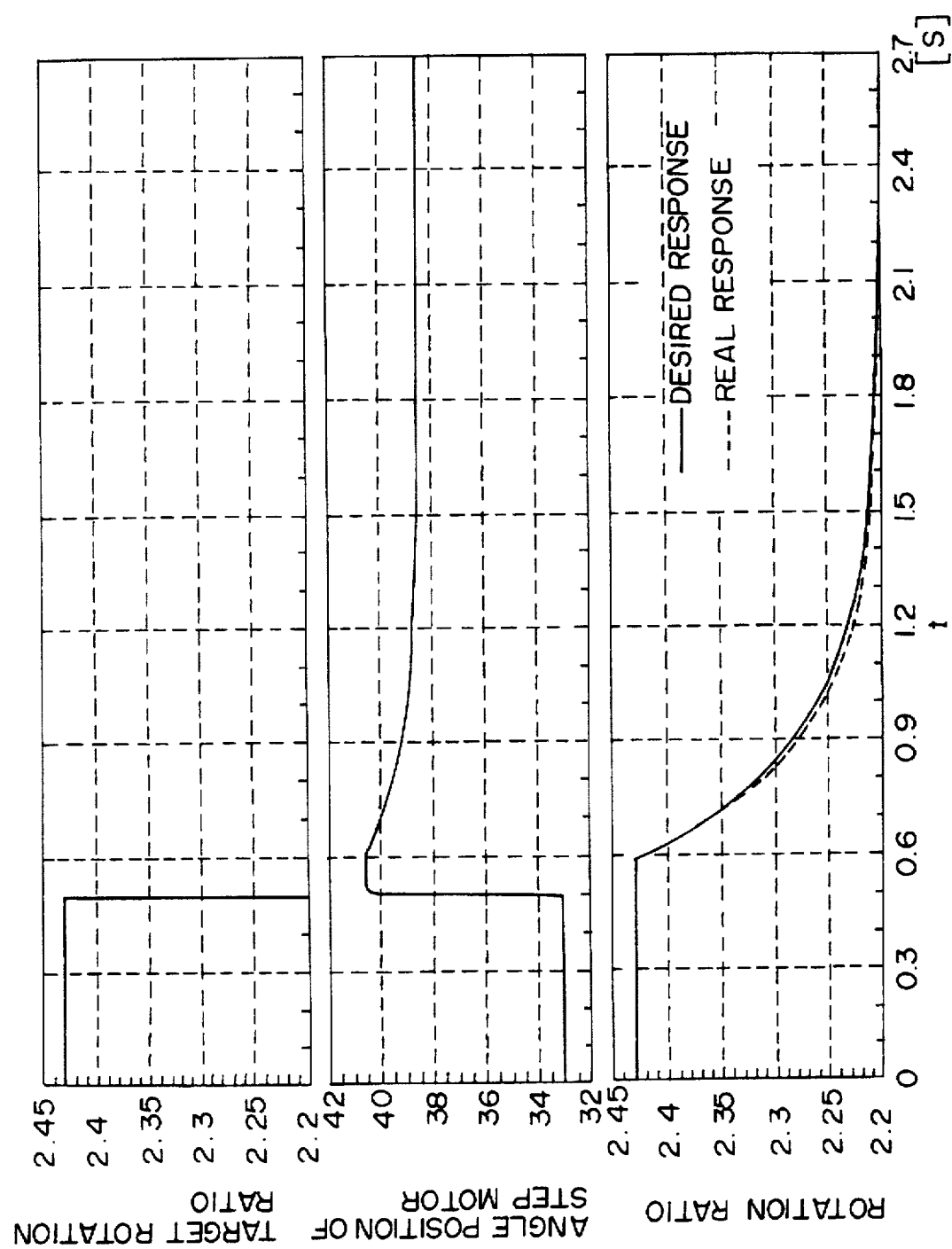
FIGS. 8A–8C are diagrams showing the results of a speed change simulation, according to this invention.

FIG. 8A–8C shows the results of a simulation of a control system wherein the target speed change response is designed according to the following relation:

$$G_T(s) = \frac{1}{0.3s + 1} \cdot \exp(-0.09s)$$

The angle position of the step motor varies as shown in FIG. 8B according to the variation of target rotation ratio shown in FIG. 8A. As a result, the speed change response obtained has characteristics, shown by the dotted line in FIG. 8C, which are extremely close to the desired characteristics shown by the solid line in FIG. 8C.

The rotation ratio command value $Si_P$ may be found also by a computation such as for example that of the following equation (9):

$$Si_P(t) = C_2(i_P) \cdot [C_1(i_P) \cdot \{i_{PT}(t) - i_{PR}(t)\} - G_{CS}(s) \cdot Si_P(t)] \tag{9}$$

where, $$G_{CS}(s) = \frac{1}{T_P(i_P)s + 1} - \frac{1}{T_P(i_P)s + 1} \cdot \exp(-Ls),$$

and $Si_P(t)$ on the right-hand side is the command value on the immediately preceding occasion.

Figure 9:
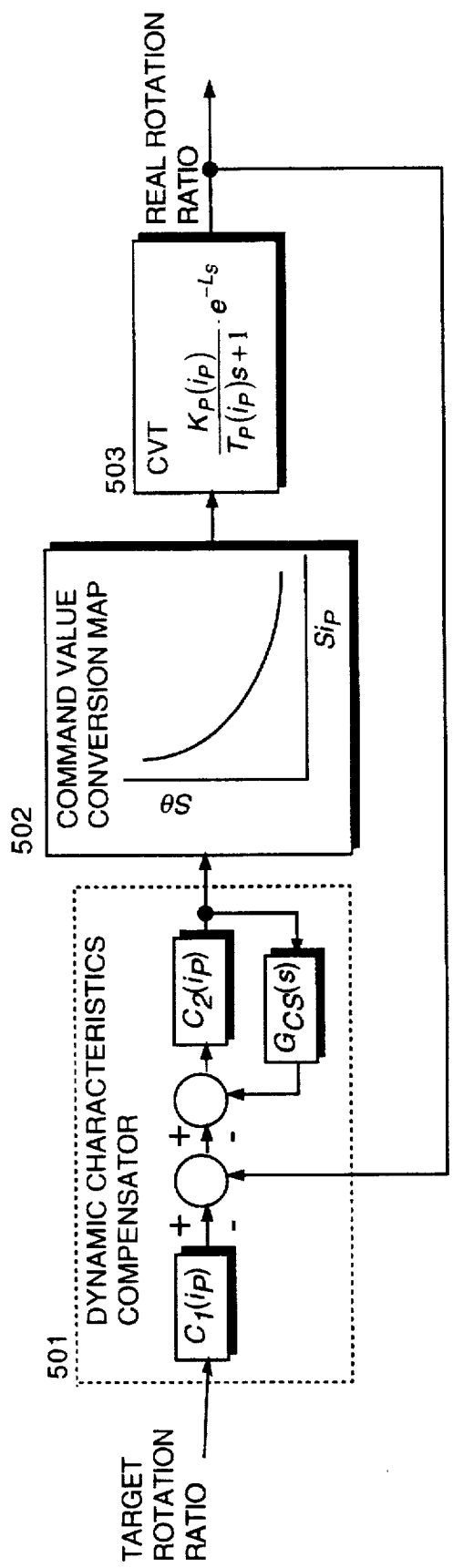
FIG. 9 is similar to FIG. 7, but showing a second embodiment of this invention.

FIG. 9 shows, by a block diagram similar to that of FIG. 7, the control concept when the rotation ratio command value $Si_P$ is calculated by equation (9).

The rotation ratio command value $Si_P$ may also be feedback controlled without feeding the real rotation ratio $i_{PR}(t)$ back into the calculation of $Si_P$, as expressed by the following equation (10):

$$Si_P(t) = \frac{T_P(i_P)s + 1}{T_T s + 1} \cdot i_{PT}(t) \tag{10}$$

Figure 10:
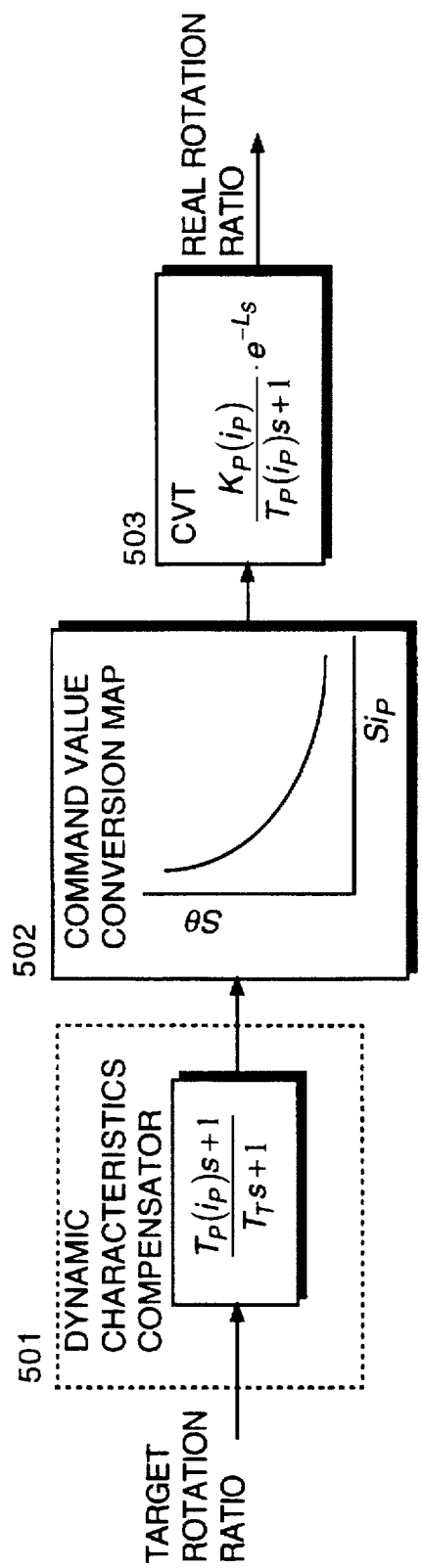
FIG. 10 is similar to FIG. 7, but showing a third embodiment of this invention.

FIG. 10 shows the control concept in this case by a block diagram similar to that of FIG. 7.

Further, in PID control of the rotation ratio command value $Si_P$, a desired speed change response may also be obtained by computing a control variables by the same method as that described above.

The embodiments of this invention in which an exclusive property or privilege is claimed are defined as follows:

1. A continuously variable transmission system for a vehicle comprising:
   a continuously variable transmission provided with a V-belt and a pair of variable pulleys on which said V-belt is looped, whereof the diameter of a part in contact with said V-belt is caused to vary according to an oil pressure,
   means for detecting a running state of said vehicle,
   means for setting a target rotation ratio of said transmission from said running state,
   means for setting a control variable which is different for each rotation ratio based on a dynamic characteristic of said transmission,
   means for detecting a real rotation ratio of said transmission,
   means for computing a rotation ratio command value based on said real rotation ratio, said target rotation ratio and said control variable, and
   a control valve for controlling said oil pressure according to a signal based on said rotation ratio command value.

2. A continuously variable transmission system as defined in claim 1, further comprising means for determining a rotation speed change direction based on a variation of said real rotation ratio, wherein said control variable setting means sets a different control variable according to said direction at a same rotation ratio.

3. A continuously variable transmission system as defined in claim 1, further comprising means for converting said rotation ratio command value to said signal such that said rotation ratio command value and said real rotation ratio are in a linear proportional relationship.

4. A continuously variable transmission system as defined in claim 3, wherein said pulleys comprise a drive pulley and a driven pulley, and said converting means converts said rotation ratio command value to said signal based on a relation between a drive pulley interval $D_S$ and a rotation ratio $i_P$ obtained from the following relations (a), (b) and (c):

$$r_i = \frac{D_S}{2 \cdot \tan\beta} + r_{i0} \tag{a}$$

$$r_0 = \frac{2 \cdot r_i - \pi \cdot D_C + \sqrt{(2 \cdot r_i - \pi \cdot D_C)^2 - 4 \cdot \{r_i^2 + \pi \cdot D_C \cdot r_i + D_C \cdot (2 \cdot D_C - L_B)\}}}{2} \tag{b}$$

$$i_P = \frac{r_0}{r_i} \tag{c}$$

where:

$r_i$ is radius of drive pulley belt contact part, $r_{i0}$ is minimum radius of drive pulley, $r_0$ is radius of belt contact part of driven pulley, $D_C$ is inter-axial distance between drive pulley and driven pulley, $L_B$ is overall length of belt, $\beta$ is pulley sheave angle.

5. A continuously variable transmission system for a vehicle comprising:
   a continuously variable transmission provided with a V-belt and a pair of variable pulleys on which said V-belt is looped, whereof the diameter of a part in contact with said V-belt is caused to vary according to an oil pressure,
   a sensor for detecting a running state of said vehicle,
   a sensor for detecting a real rotation ratio of said transmission,
   a control valve for controlling said oil pressure according to a signal, and
   a control circuit functioning to:
      set a target rotation ratio of said transmission from said running state,
      set a control variable which is different for each rotation ratio based on a dynamic characteristic of said transmission,
      compute a rotation ratio command value based on said real rotation ratio, said target rotation ratio and said control variable, and
      output said signal based on said rotation ratio command value to said control valve.

* * * * *